United States Patent
Tanaka et al.

(10) Patent No.: US 9,500,812 B2
(45) Date of Patent: Nov. 22, 2016

(54) PHOTOELECTRIC COMPOSITE CONNECTOR

(71) Applicant: OLYMPUS CORPORATION, Tokyo (JP)

(72) Inventors: Yoshinori Tanaka, Hino (JP); Satoshi Ohara, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/580,672

(22) Filed: Dec. 23, 2014

(65) Prior Publication Data

US 2015/0110444 A1    Apr. 23, 2015

Related U.S. Application Data

(63) Continuation of application No. PCT/JP2013/067540, filed on Jun. 26, 2013.

(30) Foreign Application Priority Data

Jun. 29, 2012   (JP) .................................. 2012-147459

(51) Int. Cl.
  *G02B 6/38*   (2006.01)
(52) U.S. Cl.
  CPC ........... *G02B 6/3817* (2013.01); *G02B 6/3885* (2013.01)
(58) Field of Classification Search
  None
  See application file for complete search history.

(56) References Cited

U.S. PATENT DOCUMENTS

| | | | | |
|---|---|---|---|---|
| 4,896,939 A * | 1/1990 | O'Brien | ............... | G02B 6/3816 174/110 R |
| 5,242,315 A * | 9/1993 | O'Dea | ............... | G02B 6/3817 385/59 |
| 5,574,815 A * | 11/1996 | Kneeland | ............... | G02B 6/3817 174/70 R |
| 6,776,652 B2 * | 8/2004 | Nakura et al. | ....... | G02B 6/3817 439/109 |
| 7,572,063 B2 * | 8/2009 | Mynott et al. | ....... | G02B 6/3817 385/56 |
| 7,677,813 B2 * | 3/2010 | Anrig et al. | ......... | G02B 6/3813 385/39 |

(Continued)

FOREIGN PATENT DOCUMENTS

| | | |
|---|---|---|
| JP | 6-82773 U | 11/1994 |
| JP | H07-335306 A | 12/1995 |

(Continued)

OTHER PUBLICATIONS

International Search Report dated Sep. 17, 2013 issued in PCT/JP2013/067540.

(Continued)

*Primary Examiner* — Mike Stahl
(74) *Attorney, Agent, or Firm* — Scully, Scott, Murphy & Presser, PC

(57) ABSTRACT

A photoelectric composite connector includes a first fitting member including a first holding member holding at least one first optical fiber, and at least one first electric connecting portion, and a second fitting member including a second holding member holding at least one second optical fiber, and at least one second electric connecting portion. The first and second fitting members are constituted as to fit into and onto each other so that the first and second optical fibers are optically connected and the first and second electric connecting portions are electrically connected. The first and second fitting members includes a protecting section to prevent foreign materials generated during fitting of the first and second fitting members from entering into at least the first and second holding members.

15 Claims, 8 Drawing Sheets

(56) References Cited

U.S. PATENT DOCUMENTS

| | | | | |
|---|---|---|---|---|
| 2004/0218873 A1* | 11/2004 | Nagashima et al. | G02B 6/4201 | |
| | | | | 385/75 |
| 2007/0058907 A1 | 3/2007 | Mynott et al. | | |
| 2012/0020629 A1* | 1/2012 | Shiratori et al. | G02B 6/322 | |
| | | | | 385/93 |
| 2012/0195556 A1* | 8/2012 | Wang et al. | G02B 6/3817 | |
| | | | | 385/77 |
| 2013/0108219 A1* | 5/2013 | Ootorii et al. | H01R 27/02 | |
| | | | | 385/76 |

FOREIGN PATENT DOCUMENTS

| | | |
|---|---|---|
| JP | H08-114719 A | 5/1996 |
| JP | 2003-157926 A | 5/2003 |
| JP | 2003-161864 A | 6/2003 |
| JP | 2006-210032 A | 8/2006 |
| JP | 2009-508178 A | 2/2009 |
| JP | 2013-257431 A * | 12/2013 |

OTHER PUBLICATIONS

English translation of International Preliminary Report on Patentability together with the Written Opinion dated Jan. 8, 2015 received in related International Application No. PCT/JP2013/067540.

Japanese Office Action dated Dec. 8, 2015 from related Japanese Patent Application No. 2012-147459, together with an English language translation.

* cited by examiner

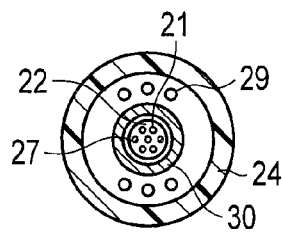
F I G. 2B
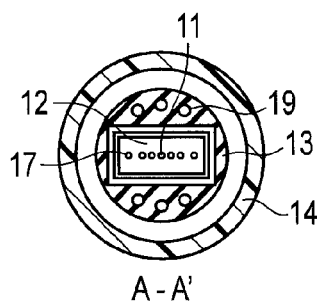
F I G. 3A
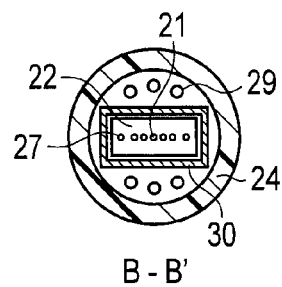
F I G. 3B

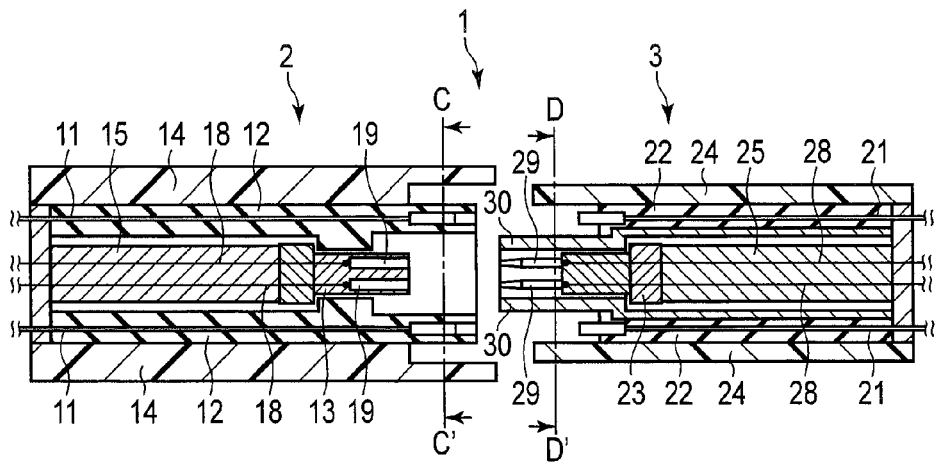
F I G. 4A
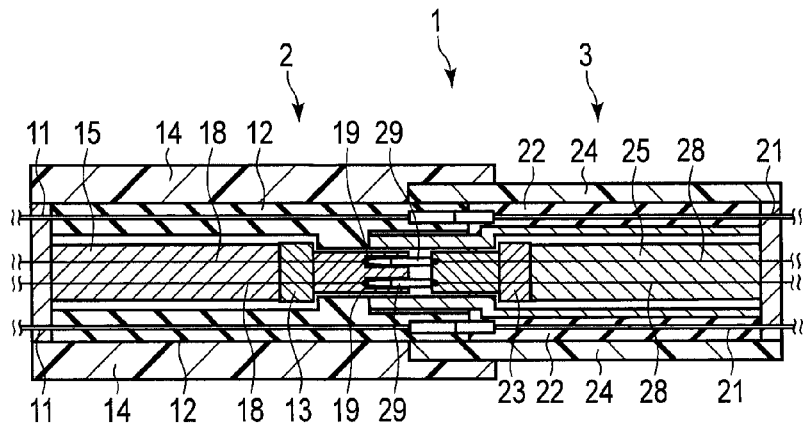
F I G. 4B
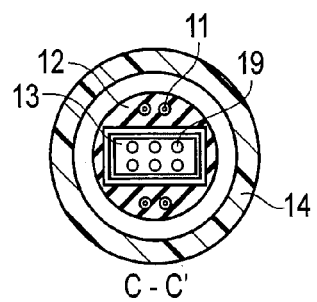
F I G. 5A

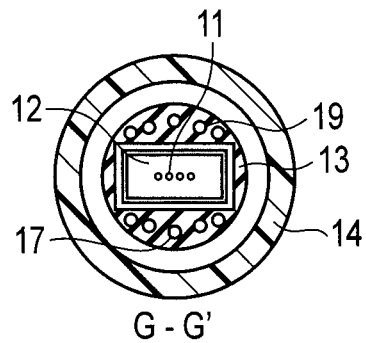
F I G. 11A
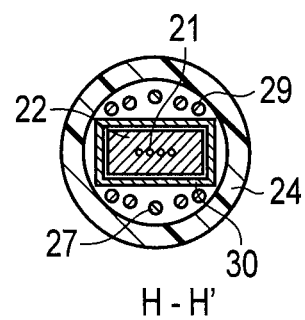
F I G. 11B

PHOTOELECTRIC COMPOSITE CONNECTOR

CROSS-REFERENCE TO RELATED APPLICATIONS

This application is a Continuation Application of PCT Application No. PCT/JP2013/067540, filed Jun. 26, 2013 and based upon and claiming the benefit of priority from Japanese Patent Application No. 2012-147459, filed Jun. 29, 2012, the entire contents of all of which are incorporated herein by reference.

BACKGROUND OF THE INVENTION

1. Field of the Invention

The present invention relates to a photoelectric composite connector including a ferrule and an electric contact terminal.

2. Description of the Related Art

As a connector such as an optical connector, an electric connector or a photoelectric composite connector, there is a so-called multicore connector in which an electric contact terminal'and a ferrule or two or more sets of electric contact terminals and ferrules are disposed in one housing. As to the photoelectric composite connector which is one of such multicore connectors, electric contact terminals and ferrules are mixedly arranged in the housing, respectively.

According to Jpn. Pat. Appln. KOKAI Publication No. H07-335306, a disclosed photoelectric composite connector includes a first fitting member in which ferrules and electric contact terminals are projected in a fitting direction, a second fitting member to be fitted into the first fitting member, a connector shell including partition walls dividing the ferrules and electric contact terminals into at least two groups, and a shutter disposed on a fitting side of this connector shell, the shutter having shutter holes allowing the ferrules and electric contact terminals to pass through the shutter. Here, in the first and second fitting members, one member from which the ferrules and the electric contact terminals are projected is a plug, and the other member is a receptacle.

The ferrules and the electric contact terminals are alternately arranged in a circumferential direction of the plug. Furthermore, during non-fitting into the receptacle, the shutter closes the fitting side of each space where the ferrules or the electric contact terminals of each group divided by the partition walls are arranged, but during fitting into the receptacle, the shutter can open the fitting side of each space so as to allow the ferrules or the electric contact terminals of each group to come in contact with corresponding contact holes.

In a conventional technology, the plug is provided with the partition walls disposed between ferrules and electric contact terminals in a circumferential direction, and the shutter disposed on the fitting side. Consequently, during non-fitting, the shutter closes, so that foreign materials (wear powder) generated by sliding of constitutional elements such as the electric contact terminals, the ferrules and first and second fitting members are prevented from mutually entering into regions where the ferrules and the electric contact terminals are disposed.

However, in the disclosed photoelectric composite connector, the ferrules and the electric contact terminals are alternately disposed and separated by the partition walls, and hence there is a tendency that the ferrules and the electric contact terminals are disposed on an outer side in a radial direction and a diameter of the connector enlarges. Furthermore, the ferrules and the electric contact terminals are alternately arranged in the form of a circle around a longitudinal axis, and hence a distance between each electric contact terminal and each ferrule is reduced, thereby shortening a distance along which the foreign materials generated from the electric contact terminals move. In consequence, for example, in a case where the shutter and a connector shell are removed, there is the possibility that the foreign materials adhere to the ferrules to deteriorate an optical coupling efficiency and/or damage end faces of the ferrules.

BRIEF SUMMARY OF THE INVENTION

An object of the present invention is to provide a photoelectric composite connector having a structure suitable for decrease of adhesion of foreign materials to ferrules and reduction of the diameter of the connector.

A photoelectric composite connector according to an aspect of the invention includes a first fitting member including a first holding member holding at least one first optical fiber, and at least one first electric connecting portion, and a second fitting member including a second holding member holding at least one second optical fiber, and at least one second electric connecting portion. The first and second fitting members are constituted as to fit into and onto each other so that the first and second optical fibers are optically connected and the first and second electric connecting portions are electrically connected. The first and second fitting members includes a protecting section to prevent foreign materials generated during fitting of the first and second fitting members from entering into at least the first and second holding members.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2B is a sectional view of a cross section taken along a line B-B' as viewed in a direction of arrows in FIG. 1A according to the first embodiment;

FIG. 3A is a sectional view of a cross section taken along a line A-A' as viewed in a direction of arrows in FIG. 1A, which shows a rectangular partition wall of the first embodiment;

FIG. 3B is a sectional view of a cross section taken along a line B-B' as viewed in a direction of arrows in FIG. 1B, which shows the rectangular partition wall of the first embodiment;

FIG. 4A is a longitudinal sectional view of the photoelectric composite connector of the first embodiment during the non-fitting;

FIG. 4B is a longitudinal sectional view of the photoelectric composite connector of the first embodiment during the fitting;

FIG. 5A is a sectional view of a cross section taken along a line C-C' as viewed in a direction of arrows in FIG. 4A according to the first embodiment;

FIG. 11A is a sectional view of a cross section taken along a line G-G' as viewed in a direction of arrows in FIG. 9A, which shows a guide pin disposed in a perpendicular direction according to the third embodiment; and FIG. 11B is a sectional view of a cross section taken along a line H-H' as viewed in a direction of arrows in FIG. 9A, which shows the guide pin disposed in the perpendicular direction according to the third embodiment.

DETAILED DESCRIPTION OF THE INVENTION

Hereinafter, embodiments of the present invention will be described in detail with reference to the drawings.

[First Embodiment]

A photoelectric composite connector 1 of the present embodiment will be described with reference to FIG. 1A and FIG. 1B.

Figure 1A:
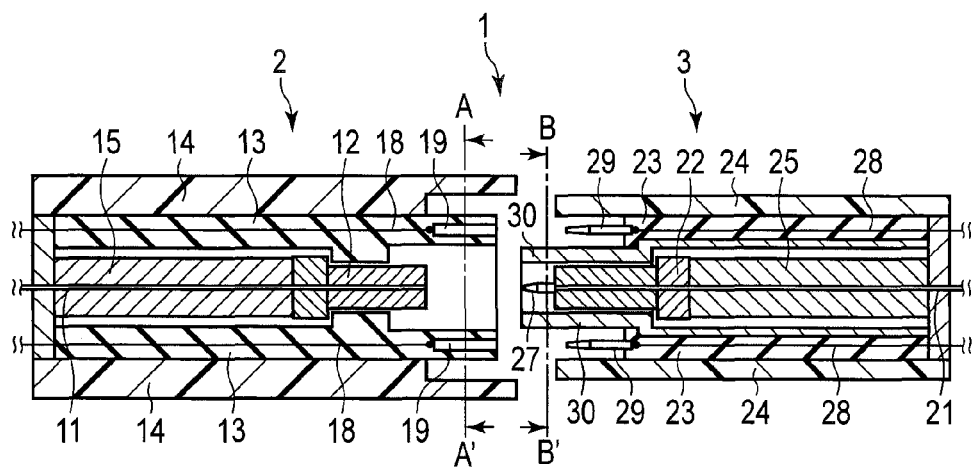
FIG. 1A is a longitudinal sectional view of a photoelectric composite connector of a first embodiment during non-fitting.

As shown in FIG. 1A, the photoelectric composite connector 1 includes a receptacle 2 as a first fitting member and a plug 3 as a second fitting member, which have such shapes as to fit into and onto each other and are attachable to and detachable from each other. As shown in FIG. 1A, the receptacle 2 and the plug 3 include internal constitutional elements, which are concavo-convex to be fitted into and onto each other in a longitudinal direction of a longitudinal cross section.

Figure 1B:
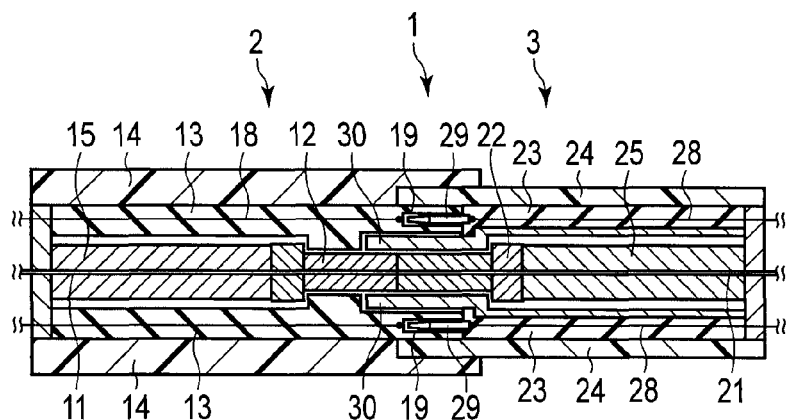
FIG. 1B is a longitudinal sectional view of the photoelectric composite connector of the first embodiment during fitting.

As shown in FIG. 1B, in the photoelectric composite connector 1, the receptacle 2 and the plug 3 are formed in such shapes as to fit into and onto each other. In the following description, concerning the longitudinal direction, an optical fiber distal end from which light is emitted in the receptacle 2 will be referred to as an emission end, and an optical fiber distal end into which the light emitted from the receptacle 2 enters in the plug 3 will be referred to as an entrance end. Furthermore, concerning the longitudinal direction, in the receptacle 2 and the plug 3, an end portion on a side from which a cable attached to a light source or an apparatus extends will be referred to as a proximal end portion. Furthermore, in the receptacle 2 and the plug 3, a portion which opens during non-fitting will be referred to as an open end.

Figure 2A:
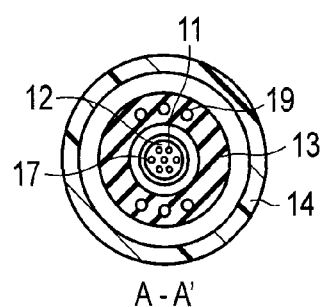
FIG. 2A is a sectional view of a cross section taken along a line A-A' as viewed in a direction of arrows in FIG. 1A according to the first embodiment.
Figure 5B:
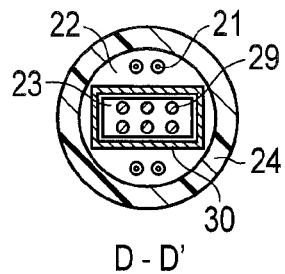
FIG. 5B is a sectional view of a cross section taken along a line D-D' as viewed in a direction of arrows in FIG. 4A according to the first embodiment.

A sectional shape of an optical connector will be referred to as FIG. 2A and FIG. 2B.

As shown in FIG. 2A, a sectional shape of the receptacle 2 is, for example, circular. As shown in FIG. 2B, a cross section of the plug 3 has a circular shape similarly to the receptacle 2. The plug 3 has such a diameter that a housing 24 is fitted into a housing of the receptacle 2. It is to be noted that sectional shapes of the vicinity of the emission end of the receptacle 2 and the vicinity of the entrance end of the plug 3 in the present embodiment are circular, but the present embodiment is not limited to this shape, and the shape may be, for example, a rectangular shape or the like.

The receptacle 2 includes first optical fibers 11, which are optical components to guide the light from the light source and extend through the receptacle in the longitudinal direction; a first ferrule 12 holding the first optical fibers 11; holes 17, formed in an abutment surface of the first ferrule 12, for positioning during fitting; a first insulator portion 13 in which a communication hole is formed; a housing 14 as a first exterior member into which the first insulator portion 13 is fitted; and a first pressing portion 15 to press the first ferrule 12 toward the emission end during the fitting.

The first insulator portion 13 has a through hole extending in the longitudinal direction, within which the first ferrule 12 and the first pressing portion 15 are contained, and at least one hole 19 provided with a contact portion at the bottom. The first insulator portion 13 includes at least one first wiring line 18 disposed to extend through the first insulator portion 13 from the contact portion to the proximal end portion side.

The first insulator portion 13 is formed of an insulator such as a rubber or a resin, forming, for example, a cylindrical shape.

In the first insulator portion 13, for example, an inner diameter of an inner wall portion on an emission end side is reduced so that the inner wall portion engages with a proximal end portion side of the first ferrule 12, and a stepped portion having a part thereof projecting in the form of a flange is thereby formed. Furthermore, the first insulator portion 13 has a constitution where a hole having such a shape as to allow the fitting of an after-mentioned partition wall 30 is formed on a distal end side from the stepped portion, and a distal end of the partition wall 30 abuts on the stepped portion during the fitting of the receptacle 2 and the plug 3. The first ferrule 12 is contained in the first insulator portion 13, and thereby disposed in a central portion of the receptacle 2. The first ferrule is constituted to abut on the stepped portion of the first insulator portion 13, which projects in the form of the flange, and is prevented from being removed to the outside. Therefore, the first ferrule 12 is inserted from the proximal end portion side.

On the other hand, the plug 3 includes second optical fibers 21 extending through the plug in the longitudinal direction; a second ferrule 22 holding the second optical fibers 21; a second insulator portion 23 in which a communication hole is formed, the second insulator portion 23 including after-mentioned electric contact terminals 29; a second housing 24 formed so as to be fitted into the receptacle 2; a second pressing portion 25 to press the second ferrule 22 toward the entrance end during the fitting, guide pins 27 as positioning members to fit into the holes 17 formed in the first ferrule 12 of the receptacle 2 and define an optical coupling position of the first and second ferrules 12, 22; and the partition wall 30 separating the electric contact terminals 29 from the second ferrule. It is to be noted that each of the first and second ferrules 12, 22 is shown like a multicore constitution, but the present invention is not limited to this constitution, and the ferrule may have a single core structure holding one optical fiber.

The second insulator portion 23 has a through hole, within which the second ferrule 22, the second pressing portion 25, and the partition wall 30 are located. The second insulator portion 23 includes the electric contact terminals 29 projected as pillars to be fitted into the respective holes 19 of the first insulator portion 13 of the receptacle 2, and having a conductivity; and second wiring lines 28 disposed to extend through the second insulator portion 23 from respective rear ends of the electric contact terminals 29 to the proximal end portion side.

The second insulator portion 23 is formed so that a distal end of each of the electric contact terminals 29 is on the proximal end portion side from the distal end of the partition wall 30. Furthermore, the second insulator portion 23 has a small diameter portion so as to forma stepped portion similarly to the first insulator portion 13, and the partition wall 30 is formed into a convex shape so as to fit into the stepped portion. Furthermore, the partition wall 30 has a small diameter portion so as to forma stepped portion in the partition wall, and second ferrule fits into the stepped portion.

The partition wall 30 has a hole to contain the second ferrule 22 and the second pressing portion 25, and a space is formed between the inner hole of the partition wall 30 and the second ferrule 22 so that the second ferrule 22 slides on and contacts with the partition wall 30. Furthermore, the partition wall 30 surrounds the second ferrule 22, and is projected on a distal end side from a distal end of the second ferrule.

The partition wall 30 has a function of diffusing heat by the light emitted from the emission ends of the first optical fibers 11. For example, the partition wall 30 is made of a material having a high heat conductivity, for example, brass, copper, or the like, and is formed to extend along an inner wall of the second insulator portion 23 in the longitudinal direction. Furthermore, the partition wall 30 is constituted to abut on the stepped portion formed into the shape projected in the form of the flange in the second insulator portion 23, and is prevented from being removed to the outside.

The electric contact terminals 29 are constituted to come in contact with the contact portions of the hole bottoms of the holes 19, thereby conducting electricity. The electric contact terminals 29 are arranged on an outer side of the partition wall 30 in a radial direction.

The first and second pressing portions 15, 25 are fitted into the first and second insulator portions 13, 23 from the proximal end portion side and fixed, and are arranged so that distal portions of the pressing portions abut on or press the proximal end portions of the first and second ferrules 12, 22 in a direction in which the ferrules contract.

The second ferrule 22 is disposed in the partition wall 30 so as to face the first ferrule 12. The second ferrule 22 is constituted to abut on the stepped portion of the partition wall 30 projected in the form of the flange, so as not to fall out to the outside. Therefore, the second ferrule 22 is inserted from the proximal end portion side.

The receptacle 2 and the plug 3 are formed so that during the fitting, the emission ends of the first optical fibers 11 abut on or come close to the entrance ends of the second optical fibers 21, to achieve the optical coupling on an optical axis. When the first and second ferrules 12, 22 are optically coupled, the light guided from the light source (not shown) is guided from the first optical fibers 11 to the second optical fibers 21 without any loss.

The first ferrule 12 holds the first optical fibers 11 so that the first optical fibers are inserted into the communication hole, and the holes 17 are disposed at such positions as to face the guide pins 27 of the end face of the second ferrule 22 on both sides of the vicinity of the communication hole. Furthermore, the distal portion of the first ferrule 12 is formed so that there is not any connection loss in the optical coupling, and polished by, for example, PC (physical contact) (not shown).

Similarly, the second ferrule 22 holds the second optical fibers 21 so that the second optical fibers are inserted into the communication hole, and the guide pins 27 are formed so that distal ends of the guide pins project from the abutment surface of the second ferrule 22 and are fitted into the holes 17 of the first ferrule 12. Furthermore, a distal portion of the second ferrule 22 is also formed so that there is not any connection loss in the optical coupling in the same manner as in the first ferrule 12 (not shown). The first and second ferrules 12, 22 are made of, for example, nickel, zirconia, brass or the like.

The guide pins 27 are disposed in the end face on an entrance end side so that the guide pins face the holes 17 to define a position where the first ferrule 12 is optically coupled to the second ferrule 22 during the fitting of the receptacle 2 and the plug 3.

It is to be noted that a sectional shape of each of the first and second ferrules 12, 22 is not limited to a cylindrical shape. As shown in FIG. 3A and FIG. 3B, the sectional shape may be, for example, a rectangular shape. In this case, each first optical fiber 11 and each second optical fiber 21 face each other, and are linearly disposed in a horizontal direction vertically crossing the optical axis.

Furthermore, it is to be noted that examples of the sectional shape of each of the first and second ferrules 12, 22 may include a rectangular shape, a circular shape, and any combination of these shapes.

Similarly, a sectional shape of each of the first and second insulator portions 13, 23 is not limited to the cylindrical shape, and examples of the sectional shape may include a rectangular shape, a cylindrical shape, and any combination of these shapes.

In the present embodiment, the second ferrule 22 is disposed in the central portion in the radial direction, and the electric contact terminals 29 are disposed on an outer circumferential side in the radial direction. Therefore, the partition wall 30 inhibits mutual entrance, into regions, of foreign materials which are generated when the second ferrule 22 and the respective electric contact terminals 29 slide to constitutional elements in the photoelectric composite connector 1, for example, the first ferrule 12 and the holes 19, respectively, during the fitting or the non-fitting of the receptacle 2 and the plug 3. The partition wall 30 diffuses, as the heat, the light by irregular reflection of the emitted light from the emission end of the first ferrule 12, and prevents local heating in the photoelectric composite connector 1. Furthermore, the emission end of the second ferrule 22 is disposed at a distance from the distal end of each of the electric contact terminals 29 so that the ends are not disposed at the same position in the longitudinal direction, and hence the second ferrule 22 is kept away from the foreign materials.

According to the present embodiment, in the photoelectric composite connector 1, the first and second ferrules 12, 22 are disposed in the central portion, and the electric contact terminals 29 are disposed in a circumference so as to surround the central portion, so that the diameter of the connector can be reduced.

The partition wall 30 is disposed, and the emission end of the second ferrule 22 is disposed at the distance from the distal end of the electric contact terminal 29 so that the ends are not disposed at the same position in the longitudinal direction. Therefore, when the electric contact terminals 29 slide into internal structural components of the receptacle 2, for example, the holes 19, the generated foreign materials are prevented from entering the regions of the first and second ferrules 12, 22. Therefore, the foreign materials do not adhere to the second ferrule 22. In consequence, an optical coupling efficiency of the photoelectric composite connector 1 can be prevented from being deteriorated.

Furthermore, the partition wall 30 formed of a heat conductive member is disposed, and hence the local heating is prevented.

It is to be noted that in the above embodiment, the first and second ferrules 12, 22 are arranged on an inner side of the partition wall 30 in the radial direction, and the holes 19 and the electric contact terminals 29 are arranged on the outer side of the partition wall 30 in the radial direction, but these arrangement may be opposite. That is, as shown in FIG. 4A, FIG. 4B and FIG. 5A, FIG. 5B, the first and second ferrules 12, 22 may be disposed on the outer side of the partition wall 30 in the radial direction, and the holes 19 and the electric contact terminals 29 may be disposed on the inner side of the partition wall 30 in the radial direction. In this case, the first and second pressing portions 15, 25 are disposed at the equivalent positions.

Figure 6A:
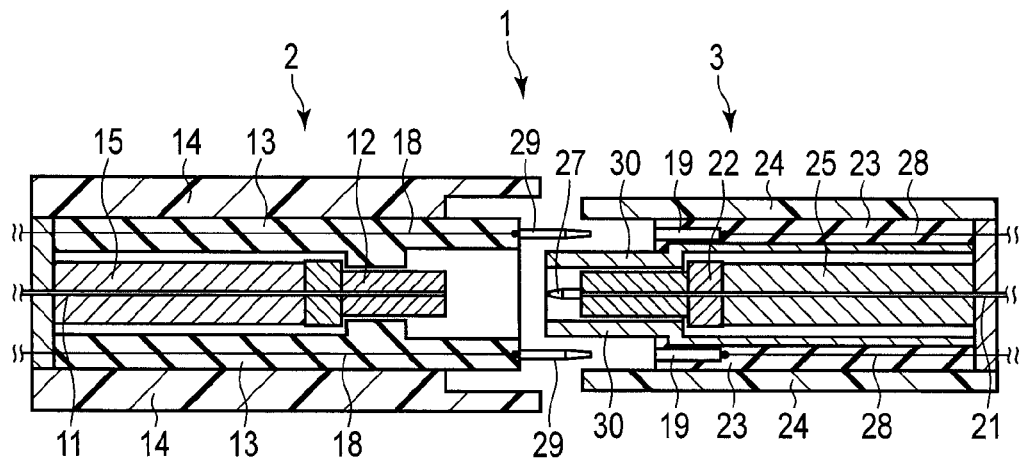
FIG. 6A is a longitudinal sectional view of a photoelectric composite connector of a modification of the first embodiment during non-fitting.
Figure 6B:
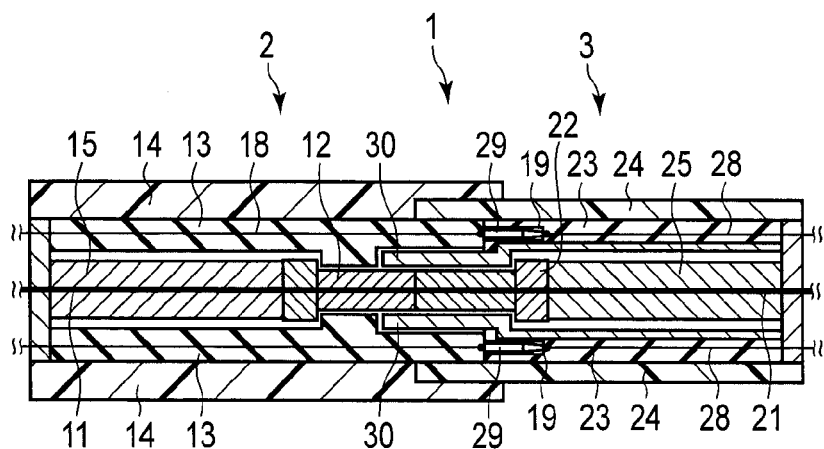
FIG. 6B is a longitudinal sectional view of the photoelectric composite connector of the modification of the first embodiment during fitting.

A modification of the first embodiment will be described with reference to FIG. 6A and FIG. 6B.

A photoelectric composite connector 1 of the modification of the first embodiment has a constitution substantially equivalent to the photoelectric composite connector 1 of the first embodiment, but is different in arrangement of holes 19 and electric contact terminals 29. Therefore, constitutional elements equal to the constitutional elements of the first embodiment are denoted with the same reference numerals and a detailed description thereof is omitted.

In the present modification, the electric contact terminals 29 are disposed in a first insulator portion 13 of a receptacle 2, and the holes 19 are formed in a second insulator portion 23 of a facing plug 3.

According to the present modification, in the receptacle 2, the electric contact terminals 29 are projected, and a first ferrule 12 is recessed, and hence the electric contact terminals 29 are disposed at a further distance from a distal end of the first ferrule 12. Similarly, in the plug 3, a distal end of a second ferrule 22 is disposed at a further distance from hole bottoms of each of the holes 19. In consequence, foreign materials generated during sliding into internal constitutional elements of the photoelectric composite connector 1 are further prevented from mutually entering into regions, and hence the foreign materials are prevented from adhering to the first and second ferrules 12, 22 and the electric contact terminals 29.

[Second Embodiment]

A photoelectric composite connector 1 of a second embodiment has a constitution substantially equivalent to the photoelectric composite connector 1 of the first embodiment, but the constitution is different in that the connector has a partition wall insertion hole 31. Therefore, constitutional elements equivalent to the constitutional elements of the first embodiment are denoted with the same reference numerals and a detailed description thereof is omitted.

Figure 7A:
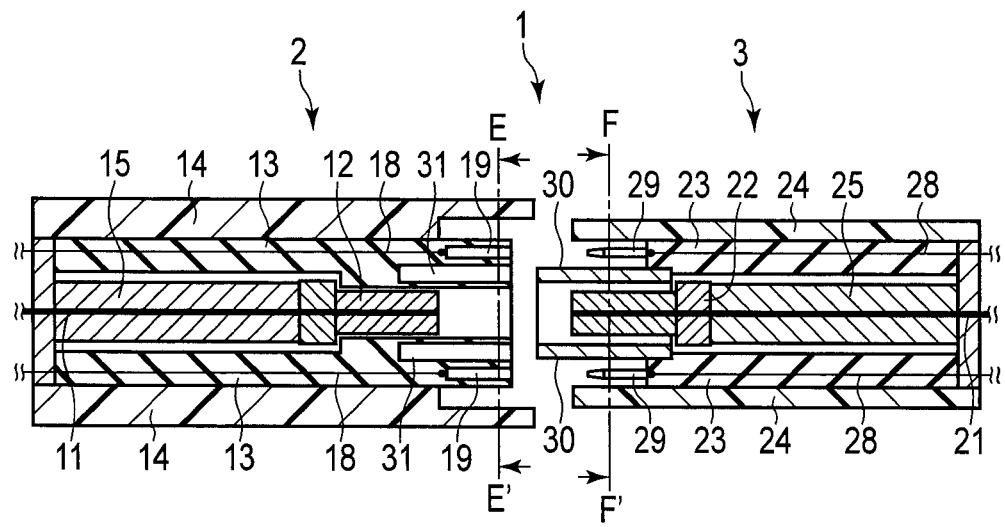
FIG. 7A is a longitudinal sectional view of a photoelectric composite connector of a second embodiment during non-fitting.
Figure 7B:
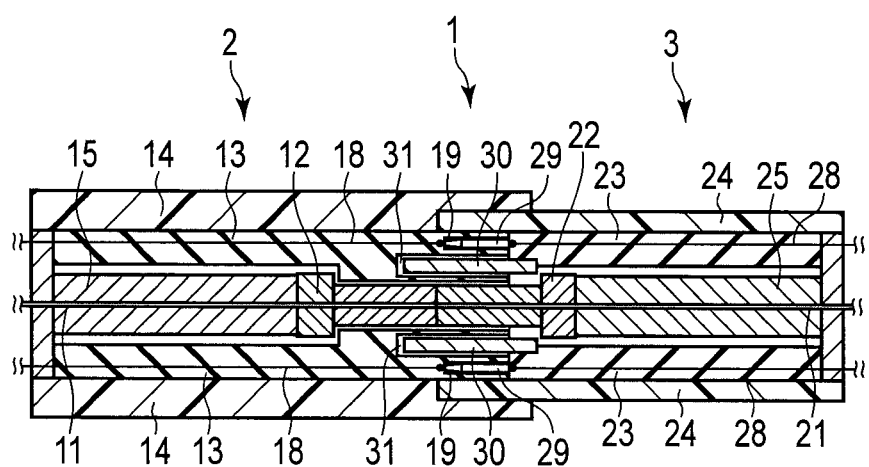
FIG. 7B is a longitudinal sectional view of the photoelectric composite connector of the second embodiment during fitting.

The photoelectric composite connector 1 of the second embodiment will be described with reference to FIG. 7A and FIG. 7B.

Figure 8A:
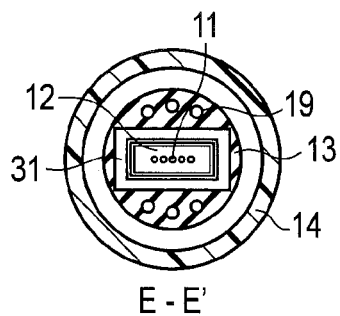
FIG. 8A is a sectional view of a cross section taken along a line E-E' as viewed in a direction of arrows in FIG. 7A according to the second embodiment.
Figure 8B:
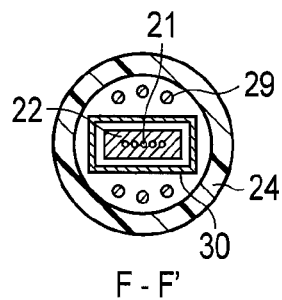
FIG. 8B is a sectional view of a cross section taken along a line F-F' as viewed in a direction of arrows in FIG. 7A according to the second embodiment.
Figure 9A:
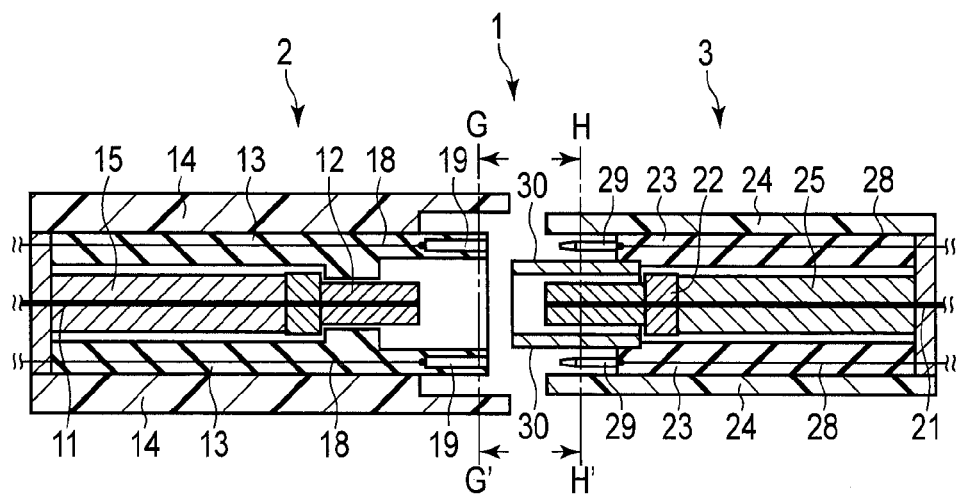
FIG. 9A is a longitudinal sectional view of a photoelectric composite connector of a third embodiment during non-fitting.
Figure 9B:
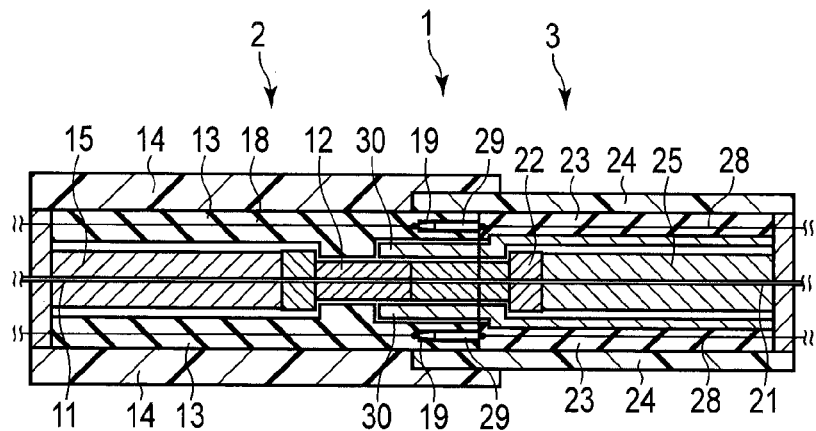
FIG. 9B is a longitudinal sectional view of the photoelectric composite connector of the third embodiment during fitting.

A receptacle 2 of the present embodiment has the partition wall insertion hole 31 to contain a partition wall 30 during fitting with a plug 3. The partition wall insertion hole 31 is formed in a portion of a first insulator portion 13 that faces the partition wall 30. A sectional shape of the partition wall 30 is, for example, a rectangular shape as shown in FIG. 8A and FIG. 8B, but may be circular.

According to the present embodiment, when the photoelectric composite connector 1 is fitted, the partition wall 30 is guided and inserted into the partition wall insertion hole 31, and hence it is possible to perform positioning between first and second ferrules 12, 22 and positioning between each hole 19 and each electric contact terminal 29. In consequence, there is not any necessity of disposing guide pins 27, and the number of members can be decreased.

Furthermore, during the fitting of the photoelectric composite connector 1, the partition wall 30 is isolated from the first and second ferrules 12, 22, and hence foreign materials generated during sliding into constitutional elements in the photoelectric composite connector 1 can be prevented from mutually entering into regions, so that the foreign materials can be prevented from adhering to end faces of the first and second ferrules 12, 22.

[Third Embodiment]

A photoelectric composite connector 1 of a third embodiment has a constitution substantially equivalent to the photoelectric composite connector 1 of the first embodiment, but is different in arrangement of guide pins 27. Therefore, the constitution equivalent to the first embodiment is denoted with the same reference numerals and a detailed description thereof is omitted.

The photoelectric composite connector 1 of the third embodiment will be described with reference to FIG. 9A, FIG. 9B and FIG. 10A, FIG. 10B.

Figure 10A:
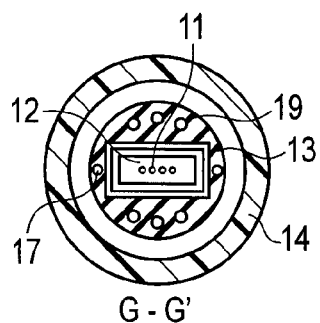
FIG. 10A is a sectional view of a cross section taken along a line G-G' as viewed in a direction of arrows in FIG. 9A according to the third embodiment.
Figure 10B:
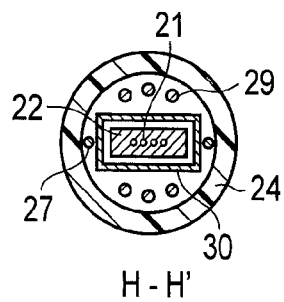
FIG. 10B is a sectional view of a cross section taken along a line H-H' as viewed in a direction of arrows in FIG. 9A according to the third embodiment.

As shown in FIG. 10A, in a receptacle 2, a first insulator portion 13 has holes 17. As shown in FIG. 10B, in a plug 3, a second insulator portion 23 has guide pins 27 facing the holes 17. The guide pins 27 are disposed on an outer side of a partition wall 30 in a radial direction. For example, the guide pins 27 are disposed in two portions in a horizontal direction vertically crossing an optical axis as shown in FIG. 10A, FIG. 10B. It is to be noted that as shown in FIG. 11A, FIG. 11B, the guide pins may be disposed in two portions in a perpendicular direction vertically crossing the optical axis.

It is to be noted that the guide pins 27 may firmly be fixed so that the guide pins do not slide in the photoelectric composite connector 1. For example, the guide pins 27 may be fixed to a first ferrule 12 and a second ferrule 22, respectively (not shown).

According to the present embodiment, the guide pins 27 are disposed on the outer side of the partition wall 30 in the radial direction, and members sliding around the second ferrule 22 are removed, so that generation of foreign materials can be prevented near the second ferrule 22. Therefore, it is possible to obtain the effect that an optical coupling efficiency can be kept.

It is to be noted that the present invention is not limited to the abovementioned embodiments, and can suitably be changed in a range which is not against the invention or thought implied from the claims and the whole description, and an ultrasonic endoscope and an insertion auxiliary tool involving such changes can also be included in the technical gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photoelectric composite connector comprising:
   a first fitting member including:
      a first holding member holding at least one first optical fiber,
      at least one first electric connecting portion, and
      a first insulator member formed around the first holding member;
   a second fitting member including:
      a second holding member holding at least one second optical fiber,
      at least one second electric connecting portion, and
      a second insulator member formed around the second holding member, and
   a protecting section to prevent foreign materials generated during fitting of the first and second fitting members from entering into at least the first and second holding members, the protecting section comprising:
      a partition wall formed around the second holding member so as to separate the second holding member and the second insulator member, the partition wall projecting further in the longitudinal direction than the second holding member and the second insulator member;
   wherein the first and second fitting members fit together such that the first and second optical fibers are optically connected and the first and second electric connecting portions are electrically connected.

2. The photoelectric composite connector according to claim 1, wherein
   the first electric connecting portion comprises an electric terminal hole, the second electric connecting portion comprises an electric contact terminal, and the electric contact terminal is inserted into the electric terminal hole to be electrically connected to the electric terminal hole, when the first and second fitting members are fitted to each other,
   the second holding member is disposed on a center side of the second fitting member, and the electric contact terminal is disposed on an outer circumferential side of the second fitting member, and
   the partition wall separating the second holding member and the electric contact terminal in a radial direction.

3. The photoelectric composite connector according to claim 1, wherein
   the first electric connecting portion comprises an electric terminal hole, the second electric connecting portion comprises an electric contact terminal, and the electric contact terminal is inserted into the electric terminal hole to be electrically connected to the electric terminal hole, when the first and second fitting members are fitted to each other, and
   the protecting section further includes a structure where a distal end of the second holding member is disposed at a distance from a distal end of the electric contact terminal in a longitudinal direction.

4. The photoelectric composite connector according to claim 2, wherein the partition wall surrounds the second holding member, and projects on an open end side from a distal end of the second holding member.

5. A photoelectric composite connector comprising:
   a first fitting member including a first holding member holding at least one first optical fiber, and at least one first electric connecting portion;
   a second fitting member including a second holding member holding at least one second optical fiber, and at least one second electric connecting portion, and
   a protecting section to prevent foreign materials generated during fitting of the first and second fitting members from entering into at least the first and second holding members
   wherein the first and second fitting members fitting together such that the first and second optical fibers are optically connected and the first and second electric connecting portions are electrically connected,
   the first electric connecting portion comprises an electric terminal hole, the second electric connecting portion comprises an electric contact terminal, and the electric contact terminal is inserted into the electric terminal hole to be electrically connected to the electric terminal hole, when the first and second fitting members are fitted to each other,
   the second holding member is disposed on a center side of the second fitting member, and the electric contact terminal is disposed on an outer circumferential side of the second fitting member,
   the protecting section comprises a partition wall separating the second holding member and the electric contact terminal in a radial direction, and
   the partition wall is formed of a heat conductive member, and the heat conductive member comprises metal.

6. The photoelectric composite connector according to claim 3, wherein
   the second holding member is disposed on a center side of the second fitting member, and the electric contact terminal is disposed on an outer circumferential side of the second fitting member,
   the partition wall separating the second holding member and the electric contact terminal in a radial direction, and
   the distal end of the second holding member is formed at the distance from the distal end of the electric contact terminal in the longitudinal direction, and the electric contact terminal does not project on an open end side from a distal end of the partition wall.

7. A photoelectric composite connector comprising:
   a first fitting member including a first holding member holding at least one first optical fiber, and at least one first electric connecting portion;
   a second fitting member including a second holding member holding at least one second optical fiber, and at least one second electric connecting portion, and a protecting section to prevent foreign materials generated during fitting of the first and second fitting members from entering into at least the first and second holding members wherein the first and second fitting members fitting together such that the first and second optical fibers are optically connected and the first and second electric connecting portions are electrically connected, the first electric connecting portion comprises an electric terminal hole, the second electric connecting portion comprises an electric contact terminal, and the electric contact terminal is inserted into the electric terminal hole to be electrically connected to the electric terminal hole, when the first and second fitting members are fitted to each other, and the protecting section has a concavo-convex structure where the first holding member is recessed in a longitudinal direction, the first electric connecting portion is projected beyond the first holding member, the second holding member is projected in the longitudinal direction, and the second electric connecting portion is recessed to the second holding member.

8. The photoelectric composite connector according to claim 2, wherein the first fitting member has a partition wall insertion hole into which the partition wall is inserted and which defines a position to optically connect the first optical fiber to the second optical fiber.

9. The photoelectric composite connector according to claim 4, wherein the second fitting member further has, on an outer circumferential side of the partition wall, at least one positioning member which defines a position to optically connect the first optical fiber to the second optical fiber, when the first fitting member and the second fitting member are fitted, the first fitting member further has a positioning hole which is disposed at such a position as to face the positioning member and into which the positioning member is fitted, and the first and second holding members are disposed on center sides of the first and second fitting members, respectively.

10. A photoelectric composite connector comprising:

a first fitting member including a first holding member holding at least one first optical fiber, and at least one first electric connecting portion;

a second fitting member including a second holding member holding at least one second optical fiber, and at least one second electric connecting portion, and a protecting section to prevent foreign materials generated during fitting of the first and second fitting members from entering into at least the first and second holding members wherein the first and second fitting members fitting together such that the first and second optical fibers are optically connected and the first and second electric connecting portions are electrically connected, the first electric connecting portion comprises an electric terminal hole, the second electric connecting portion comprises an electric contact terminal, and the electric contact terminal is inserted into the electric terminal hole to be electrically connected to the electric terminal hole, when the first and second fitting members are fitted to each other, the second holding member is disposed on an outer circumferential side of the second fitting member, and the electric contact terminal is disposed on a center side of the second fitting member, and the protecting section comprises a partition wall separating the second holding member and the electric contact terminal in a radial direction.

11. The photoelectric composite connector according to claim 5, wherein the second fitting member further has, on an outer circumferential side of the partition wall, at least one positioning member which defines a position to optically connect the first optical fiber to the second optical fiber, when the first fitting member and the second fitting member are fitted, the first fitting member further has a positioning hole which is disposed at such a position as to face the positioning member and into which the positioning member is fitted, and the first and second holding members are disposed on center sides of the first and second fitting members, respectively.

12. The photoelectric composite connector according to claim 1, wherein the second fitting member includes a positioning member to define a position of optical coupling between the first and second optical fibers, when the first and second fitting members are fitted to each other, and the second holding member and the positioning member are disposed on a center side of the partition wall, and the second electric connecting portion is disposed on an outer circumferential side of the second partition wall.

13. The photoelectric composite connector according to claim 1, wherein the partition wall surrounds the second holding member, and projects on an open end side from a distal end of the second holding member.

14. The photoelectric composite connector according to claim 2, wherein the partition wall is formed of a heat conductive member, and diffuses, as the heat, light by irregular reflection of the light emitted from the first optical fiber.

15. The photoelectric composite connector according to claim 1, wherein a position in a longitudinal direction at which facing end faces of the first and second holding members are disposed is different from a position in the longitudinal direction at which facing end faces of the first and second insulator members are disposed, when the first and second fitting members are fitted to each other.

* * * * *